No. 716,035. Patented Dec. 16, 1902.
C. A. H. HARTING.
LENS.
(Application filed Feb. 4, 1901.)
(No Model.)
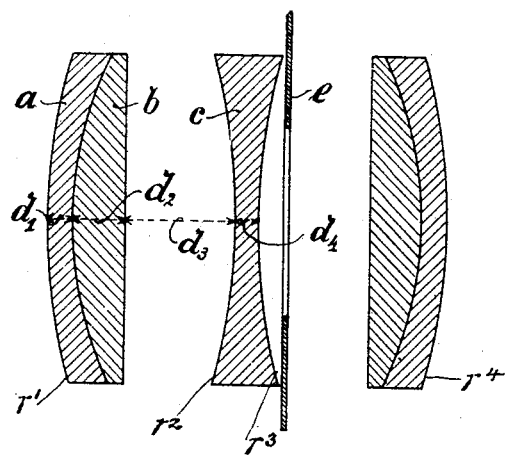

UNITED STATES PATENT OFFICE.

CARL AUGUST HANS HARTING, OF BRUNSWICK, GERMANY, ASSIGNOR TO VOIGTLÄNDER & SOHN AKTIEN GESELLSCHAFT, OF BRUNSWICK, GERMANY.

LENS.

SPECIFICATION forming part of Letters Patent No. 716,035, dated December 16, 1902.

Application filed February 4, 1901. Serial No. 46,008. (No model.)

*To all whom it may concern:*

Be it known that I, CARL AUGUST HANS HARTING, manager, a subject of the Duke of Brunswick, residing at Brunswick, Duchy of Brunswick, Germany, have invented certain new and useful Improvements in Lenses, of which the following is a specification.

This invention has for its object a lens system corrected symmetrically and also achromatically, spherically, and astigmatically for wide apertures.

If in an objective formed of similar pairs of lenses the kinds of glass are graded in such a way that they also possess, in combination with a large index of refraction, great color dispersion, it may, as is well known, be corrected spherically for any desired size of aperture, but not astigmatically. If, on the other hand, such an objective be formed of kinds of glass with the larger indices of refraction having a smaller color dispersion, a considerable improvement results, as is well known, in the position of the astigmatic picture-surfaces, but not sufficient spherical correction for even medium apertures. The present invention affords, however, for large apertures a complete spherical correction both on and outside the axis, and, further, removes astigmatism and curvature in the field of vision.

The arrangement is as follows: Between two symmetrically-arranged systems of either one or other kind hereinbefore mentioned a third system is symmetrically arranged relatively to the two outer ones and which may consist of one lens. Whether this system is required to be converging or diverging, the whole system may be spherically corrected. In order, however, to remove the astigmatism and curvature of the field of vision left by the outer systems—that is to say, to correct the objective into an astigmatic lens—the kinds of glass to be used are chosen in the following manner: The two outer lens systems consist, as already mentioned, at least of two lenses, crown and flint glass, and the crown-glass must have in both systems either a larger or a smaller index of refraction than the respective flint-glass. The third system, inserted between the two, must, however, be so selected that the kinds of glass of which it is composed will correspond in a given manner to the kinds of glass of the outer systems which stand opposite to its faces, and, in fact, one glass with a large index of refraction and a small color dispersion must face a similar one the index of refraction of which is smaller or approximately as great as that of the other, while its color dispersion is greater. By this means it is possible, in consequence of the removal of the faults resulting from spherical abberration, to obtain first in the center of the picture an extraordinary sharpness, the cause of which is in the reduction or removal of the intermediate spherical defects. As, however, the spherical aberration of the oblique group of rays is at the same time almost completely removed and as it is possible to produce an astigmatic leveling over the whole field of vision, which, for instance, amounts to about fifty degrees for a relative opening of a 1:4.5, it follows that the optical picture with a sufficient expansion has an extraordinary sharpness even outside the optical axis. As the whole system is symmetrically arranged in itself, the distortion is removed, so that it is practically unnoticeable, so that the picture that is formed is almost perfectly true. As an example a case which is typical for the object of the application will be explained.

The accompanying drawing shows the objective.

The outer systems may be formed each of two lenses $a$ and $b$, of which the two lenses $a$ are made of flint-glass and the two lenses $b$ of crown-glass of higher refractive index and smaller light dispersion. The symmetrically-arranged central lens $c$ must then be made of crown-glass, the index of refraction of which is lower or only equally as large and its color dispersion larger than that of the crown-glass of the lenses $b$. If the four different radii of curvature of the lenses corresponding to the object sought after are indicated in the drawing by $r'$ $r^2$ $r^3$ $r^4$ and the thicknesses of the lenses by $d'$ $d^2$ $d^3$ $d^4$, a calculation yields the following equivalents: $r'$ equals $+41.0$, $r^2$ equals $+25.76$, $r^3$ equals $-583.8$, $r^4$ equals $-44.76$, $d'$ equals $+1.6$, $d^2$ equals $+3.6$, $d^3$ equals $+8.1$, $d^4$ equals $+1.6$. The equivalents of the kinds of glass are here assumed to be the following: For $a$ and $c$, $n^D$ equals $1.5638$, $n^{G'}$ equals 1.5811; for $a$ and $b$, $n^D$ equals 1.6080, $n^{G'}$ equals 1.6217. The size of the aperture, which may be indicated for this objective with a focal length of one hundred, amounts to twenty-five; the diameter of the utilizable picture, eighty. The blind or shutter $e$ is placed directly behind the central lens.

I declare that what I claim is—

A compound objective lens comprising two groups of lenses, the outer lens of each of the groups constructed of flint-glass and the inner lens of crown-glass, the latter being of a higher refractory index and smaller color dispersion than the former, and a crown-glass lens interposed between the said groups of lenses and forming with the crown-glass lenses of the group facing it, pairs of glasses, with the index of refraction of the middle lens not larger, but the color dispersion thereof larger than that of, the crown-glass lenses facing it.

In testimony whereof I have hereunto set my hand in presence of two subscribing witnesses.

CARL AUGUST HANS HARTING.

Witnesses:
JULIEN SACKEL,
W. LEHRKE.